US009039247B2

(12) United States Patent
Wang He

(10) Patent No.: US 9,039,247 B2
(45) Date of Patent: May 26, 2015

(54) BACKLIGHT MODULE INCLUDING CIRCULAR AND CYLINDER FRESNEL LENSES

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/916,518

(22) Filed: Jun. 12, 2013

(65) Prior Publication Data

US 2014/0177267 A1   Jun. 26, 2014

(30) Foreign Application Priority Data

Dec. 21, 2012  (TW) .............................. 101149089 A

(51) Int. Cl.
G02F 1/1335 (2006.01)
F21V 5/00 (2006.01)

(52) U.S. Cl.
CPC .......... G02F 1/133605 (2013.01); F21V 5/007 (2013.01); G02F 1/133603 (2013.01); G02F 1/133606 (2013.01)

(58) Field of Classification Search
CPC ..................................... G02F 1/1336–1/133609
USPC ............... 362/97.1–97.4, 606, 607, 612, 621, 362/622, 624, 625; 349/64; 359/742
See application file for complete search history.

(56) References Cited

U.S. PATENT DOCUMENTS

| 4,312,330 | A  | * | 1/1982 | Holdridge ...................... 126/698 |
| 6,325,524 | B1 | * | 12/2001 | Weber et al. ................... 362/245 |
| 7,532,395 | B2 | * | 5/2009 | Doi ................................ 359/443 |
| 7,708,428 | B2 | * | 5/2010 | Park et al. ...................... 362/241 |
| 2007/0171651 | A1 | * | 7/2007 | Park et al. ...................... 362/330 |
| 2010/0238379 | A1 | * | 9/2010 | Shutou et al. ................... 349/64 |
| 2012/0081897 | A1 | * | 4/2012 | Ogawa et al. .................. 362/245 |
| 2012/0105763 | A1 | * | 5/2012 | Takeuchi et al. ................ 349/61 |
| 2013/0148333 | A1 | * | 6/2013 | Ha et al. ........................ 362/97.2 |
| 2014/0022490 | A1 | * | 1/2014 | Baek et al. ...................... 349/62 |
| 2014/0063849 | A1 | * | 3/2014 | Chang et al. ................... 362/612 |
| 2014/0104815 | A1 | * | 4/2014 | Arai et al. ...................... 362/97.1 |
| 2014/0133180 | A1 | * | 5/2014 | Sakai ............................. 362/612 |

* cited by examiner

*Primary Examiner* — Robert May
*Assistant Examiner* — Christopher E Dunay
(74) *Attorney, Agent, or Firm* — Novak Druce Connolly Bove + Quigg LLP

(57) ABSTRACT

A backlight module includes a carrier plate, a plurality of light sources, a plurality of circular Fresnel lenses, and a plurality of cylinder Fresnel lenses. The circular Fresnel lenses are arranged in an array form on the carrier plate. The light sources correspond to the circular Fresnel lenses, and are located in a side away from the carrier plate. One cylinder Fresnel lens is set between every two adjacent circular Fresnel lenses. A length direction of each cylinder Fresnel lens is parallel to an extending direction of adjacent column of the circular Fresnel lens. The circular and cylinder Fresnel lenses are used to reflect a light incident into their surfaces, and to increase an emission angle of the reflected light.

6 Claims, 3 Drawing Sheets

BACKLIGHT MODULE INCLUDING CIRCULAR AND CYLINDER FRESNEL LENSES

BACKGROUND

1. Technical Field

The present disclosure relates to a backlight module, and particularly to a direct-type backlight module for illuminating a display.

2. Description of Related Art

A direct-type backlight module includes an array of light sources. Since an optical density of the light sources is concentrated in intermediate portion of a light beam emitted by the light source, the optical density at an edge portion of the light sources is sparse, resulting in an uneven distribution of brightness of the backlight module.

What is need, therefore, is an LED backlight module which overcomes the above described shortcomings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
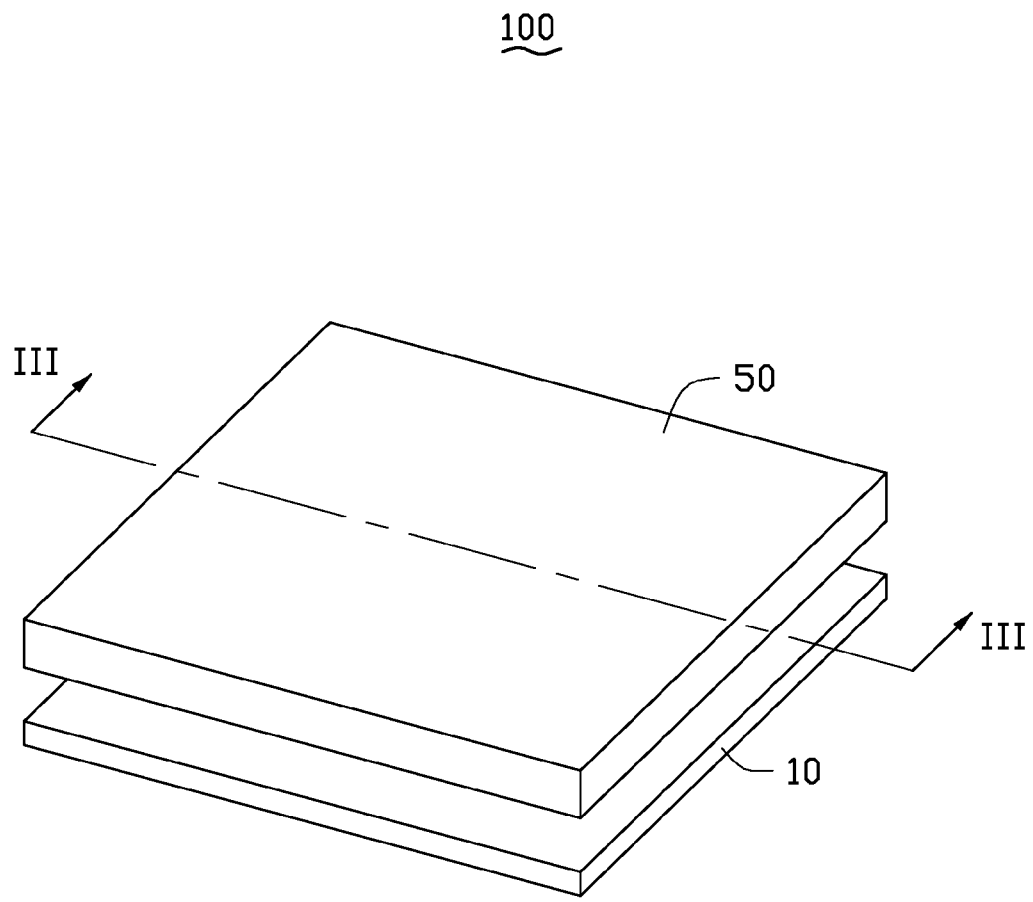
FIG. 1 is a schematic view of a direct-type backlight module, in accordance with an exemplary embodiment.
Figure 2:
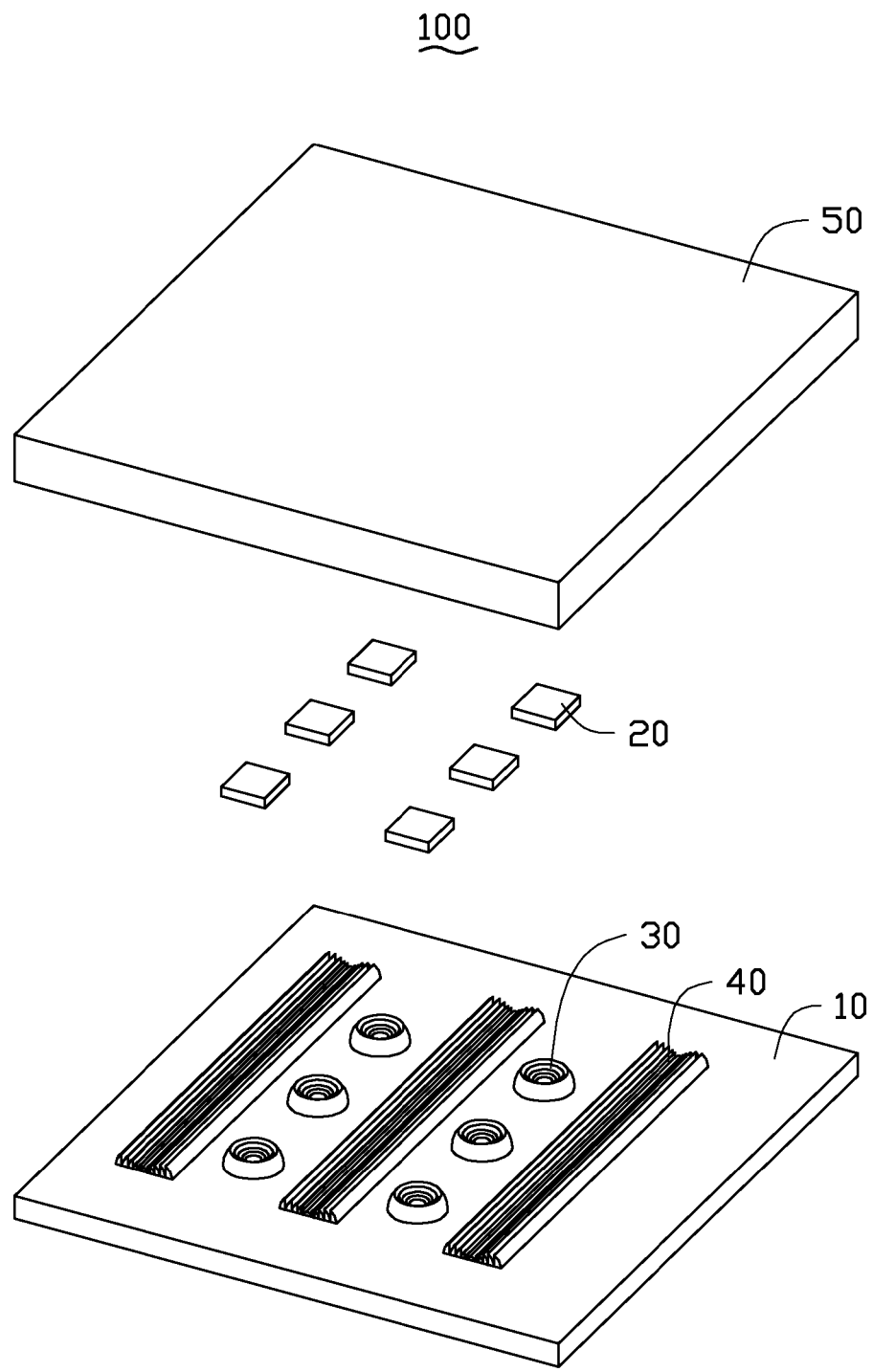
FIG. 2 is an exploded view of the direct-type backlight module of FIG. 1.

Embodiments will now be described in detail below with reference to the drawings. FIGS. 1 and 2 show a backlight module 100 according an exemplary embodiment. The backlight module 100 includes a carrier plate 10, a plurality of light sources 20, a plurality of circular Fresnel lenses 30, a plurality of cylinder Fresnel lenses 40, and a light guide device 50. The carrier plate 10 can be a reflective plate.

Figure 3:
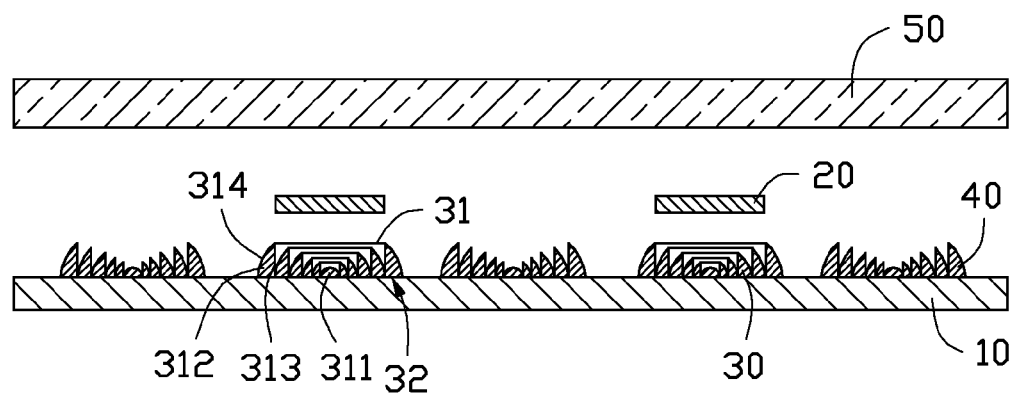
FIG. 3 is a schematic cross sectional view of the direct-type backlight along III-III line of FIG. 1.

FIG. 3 shows that the plurality of circular Fresnel lenses 30 are arranged in an array form on the carrier plate 10. Cross section of each circular Fresnel lenses 30 along its own diameter direction includes an optical surface 31 and an opposite bottom surface 32. The bottom surface 32 is a flat surface. The optical surface 31 includes a center portion 311 and a plurality of sector portions 312, which are symmetrical to the center portion 311. The center portion 311 has a semi-elliptical configuration, each sector portions 312 includes a right angle side 313 and a curved side 314. The right angle side 313 and the curved side 314 are directly connected with the bottom surface 32. The right angle side 313 is perpendicular to the bottom surface 32. A length of the plurality right angle sides 313 gradually increases from the center portion 311 facing toward a direction away from the center portion 311.

The plurality of light sources 20 correspond with the plurality of circular Fresnel lenses 30, and are positioned in a side away from the carrier plate 10. The circular Fresnel lens 30 is arranged for reflecting a light incident into its surface, and for increasing an emission angle of the reflected light. Therefore, the uniformity of the brightness of the backlight module 100 is increased.

The plurality of cylinder Fresnel lenses 40 are parallel to each other. One cylinder Fresnel lens 40 is set between every two adjacent circular Fresnel lenses 30. A length direction of each cylinder Fresnel lens 40 is parallel to an extending direction of adjacent column of the circular Fresnel lens 30. Since a light intensity is relatively low at an area between the adjacent two columns of the light sources 20. Since a light incident into the surface of the cylinder Fresnel lens 40 can be reflected, and an emission angle of reflected light is increased. Therefore, the uniformity of the brightness of the backlight module 100 is increased. A cross sectional of each cylinder Fresnel lenses 40 along a direction perpendicular to its length is the same as the cross sectional along a radial direction of the circular Fresnel lenses 30.

The light guide device 50 and the carrier plate 10 are parallel to each other, and is located at a side away from the plurality of circular Fresnel lenses 30 and the light sources 20. The light guide device 50 is configured for receiving an emitted light of the plurality of light sources 20, and for receiving the reflected lights of the circular and the cylinder Fresnel lenses 30, 40, then conducts the received lights to the outside.

In the present embodiment of the direct-type backlight module 100, the plurality of circular Fresnel lenses 30 are set below the corresponding light sources 20. The incident light on the surface of the circular Fresnel lens 30 is diffused, then the plurality of cylinder Fresnel lens 40 are configured to diffuse the incident light between two adjacent columns of the light sources 20, therefore the uniformity of the brightness of the backlight module 100 is increased.

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A backlight module, comprising:
    a carrier plate;
    a plurality of light sources;
    a plurality of circular Fresnel lenses, wherein the plurality of circular Fresnel lenses are arranged in an array form on the carrier plate; and
    a plurality of cylindrical Fresnel lenses that are parallel to each other; wherein each of the plurality of light sources correspond with each of the plurality of circular Fresnel lenses, wherein each of the plurality of light sources are positioned away from both the circular Fresnel lenses and the carrier plate; one cylindrical Fresnel lens is set between every two adjacent circular Fresnel lenses; a length direction of each cylindrical Fresnel lens is parallel to an extending direction of adjacent column of the circular Fresnel lens; the plurality of circular and cylindrical Fresnel lenses arranged to reflect light incident into surfaces of the plurality of circular and cylindrical Fresnel lenses, and to increase an emission angle of the reflected light.

2. The backlight module as claimed in claim 1, wherein a cross sectional of each circular Fresnel lenses along its own diameter direction comprises an optical surface and an opposite bottom surface; the bottom surface is a flat surface; the optical surface comprises a center portion and a plurality of sector portions which are symmetrical to the center portion; the center portion being semi-elliptical, each sector portions comprises a right angle side and a curved side; the right angle side and the curved side are directly connected with the bottom surface; the right angle side is perpendicular to the bottom surface; a length of the plurality right angle sides gradually increases from the center portion facing toward a direction away from the center portion.

3. The backlight module as claimed in claim 2, wherein a cross section of each cylindrical Fresnel lenses along a direction perpendicular to its length is the same as the cross sectional along a radial direction of the circular Fresnel lenses.

4. The backlight module as claimed in claim 1, wherein the backlight module comprises a light guide device located at a side away from the plurality of circular Fresnel lenses and the light sources; the light guide device is configured to receive an emitted light of the plurality of light sources, and receive the reflected lights of the circular and the cylindrical Fresnel lenses.

5. The backlight module as claimed in claim 4, wherein the light guide device and the carrier plate are parallel to each other.

6. The backlight module as claimed in claim 5, wherein the carrier plate is a reflective plate.

* * * * *